United States Patent
Hirose et al.

(10) Patent No.: US 7,252,057 B2
(45) Date of Patent: Aug. 7, 2007

(54) APPARATUS AND METHOD FOR CONTROLLING INTERNAL COMBUSTION ENGINE

(75) Inventors: Kiyoo Hirose, Nagoya (JP); Hiroshi Morita, Obu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/290,574

(22) Filed: Dec. 1, 2005

(65) Prior Publication Data
US 2006/0124090 A1   Jun. 15, 2006

(30) Foreign Application Priority Data
Dec. 15, 2004   (JP)   ............ 2004-363562

(51) Int. Cl.
*F01L 1/34* (2006.01)
(52) U.S. Cl. ............ 123/90.15; 123/90.16; 123/90.31

(58) Field of Classification Search ............ 123/90.15, 123/90.16, 90.31, 90.11
See application file for complete search history.

(56) References Cited

U.S. PATENT DOCUMENTS 5,979,158 A * 11/1999 Kaiser et al. .......... 60/274
6,640,756 B2 * 11/2003 Ogiso .......... 123/90.11

FOREIGN PATENT DOCUMENTS

| JP | A 2000-34913 | 2/2000 |
| JP | A 2001-263015 | 9/2001 |

* cited by examiner

*Primary Examiner*—Thomas Denion
*Assistant Examiner*—Zalalem Eshete
(74) *Attorney, Agent, or Firm*—Oliff & Berridge PLC

(57) ABSTRACT

An electronic control unit increases the maximum lift amount or the working angle of an intake valve if it is determined that the operation for stopping an engine is performed. The electronic control unit stops fuel injection or ignition before increasing the maximum lift amount or the working angle.

11 Claims, 4 Drawing Sheets

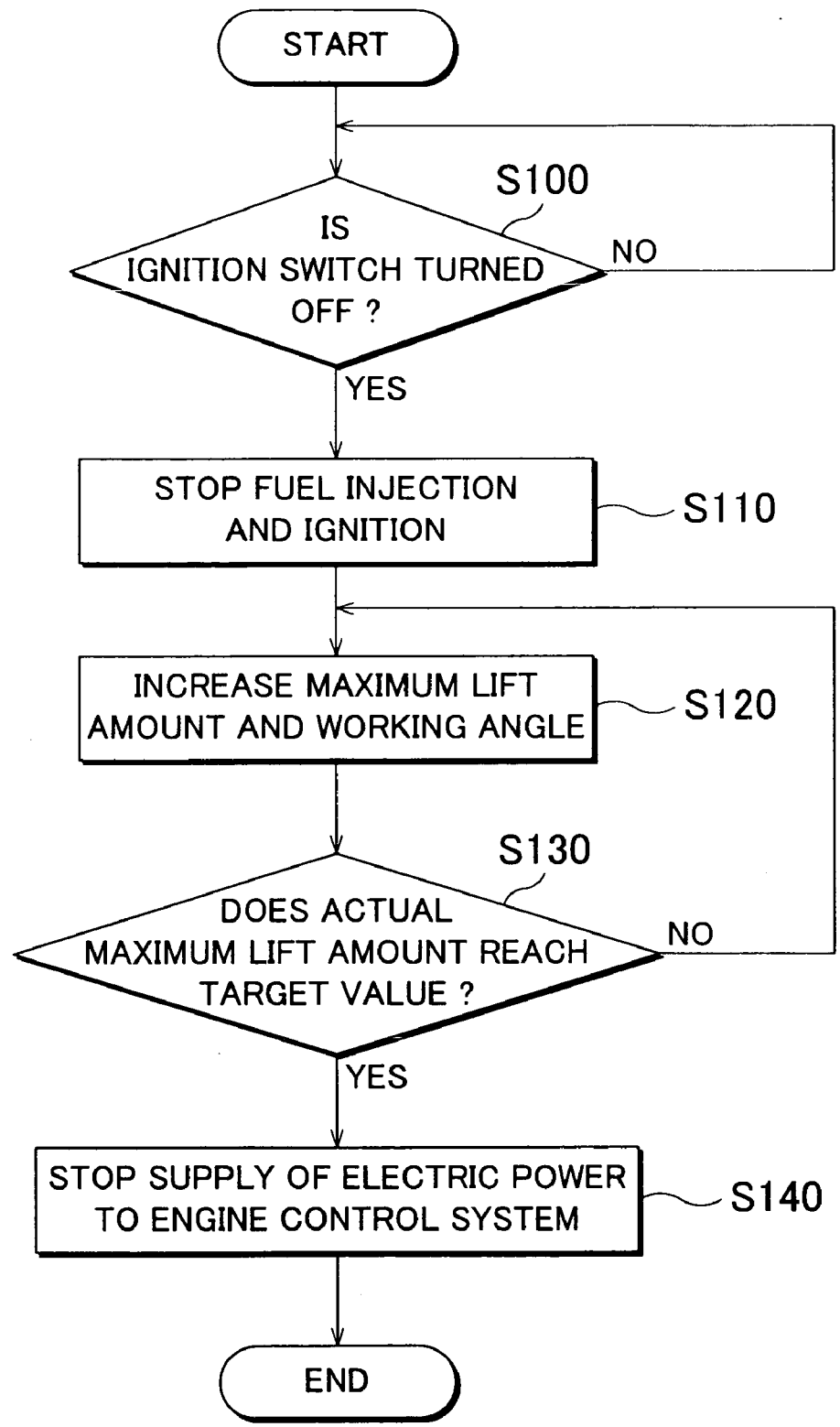

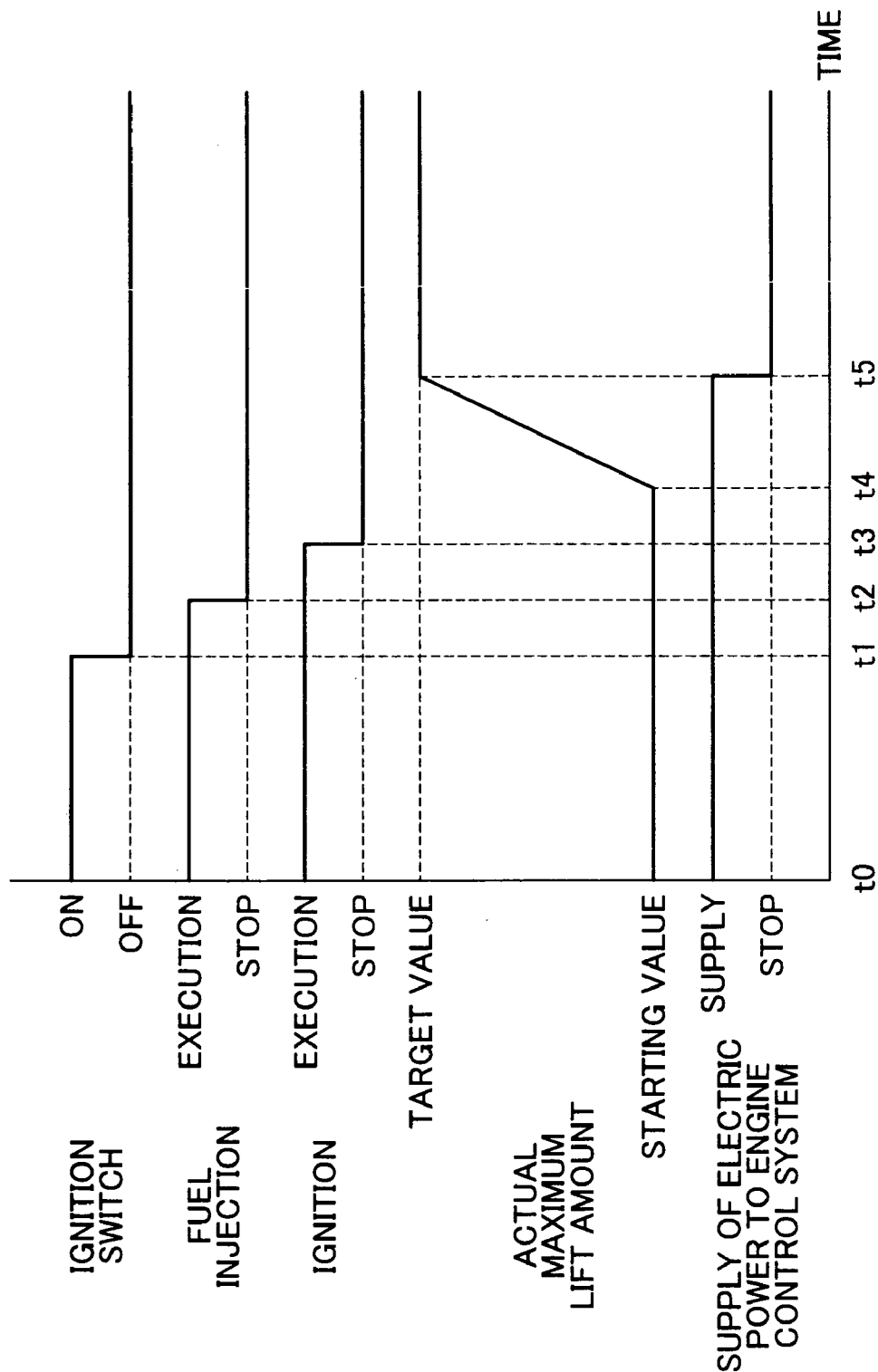

APPARATUS AND METHOD FOR CONTROLLING INTERNAL COMBUSTION ENGINE

INCORPORATION BY REFERENCE

The disclosure of Japanese Patent Application No. 2004-363562 filed on Dec. 15, 2004 including the specification, drawings and abstract is incorporated herein by reference in its entirety.

BACKGROUND OF THE INVENTION

1. Field of the Invention

The invention relates to an apparatus and method for controlling an internal combustion engine that includes a variable valve mechanism that can change at least one of the maximum lift amount and the working angle of an intake valve.

2. Description of the Related Art

Valve lift control systems are proposed, which control the maximum lift amount and the working angle of a valve of an internal combustion engine according to the operating state of the engine. Japanese Patent Application Publication No. JP-A-2001-263015 describes a typical valve lift control system. In an internal combustion engine using such a variable valve lift control system, the amount of air taken into a combustion chamber can be reduced by reducing the maximum lift amount and the working angle of an intake valve. Thus, when the amount of air required for combustion is small, for example, during idling operation, the amount of air taken into the combustion chamber can be reduced by reducing the maximum lift amount and the working angle of the intake valve. In the case where the amount of air taken into the combustion chamber is reduced by reducing the maximum lift amount and the working angle of the intake valve, pumping loss can be reduced as compared to the case where the amount of air taken into the combustion chamber is reduced by reducing the opening amount of a throttle valve. That is, loss of output of the internal combustion engine can be suppressed, which improves fuel efficiency.

Thus, by reducing the pumping loss, fuel efficiency is improved. However, this reduces the rotational resistance against the idle rotation of the output shaft after fuel injection and ignition are stopped to stop the engine. This results in the increase in the time required to completely stop the internal combustion engine.

SUMMARY OF THE INVENTION (US)

It is an object of the invention to provide an apparatus and method for controlling an internal combustion engine, which can change at least one of the maximum lift amount and the working angle of an intake valve to improve fuel efficiency, while suppressing an increase in the period during which the output shaft of the engine is idling when the engine is stopped.

A first aspect of the invention relates to an apparatus for controlling an internal combustion engine including a variable valve mechanism that can change the maximum lift amount of an intake valve. The control apparatus includes a determining device, a changing device, and a stop device. The determining device determines whether the operation for stopping the engine is performed. The changing device controls the variable valve mechanism so as to increase the maximum lift amount of the intake valve if the determining device determines that the operation for stopping the engine is performed. The stop device stops at least one of fuel injection and ignition before the changing device changes the maximum lift amount.

With this configuration, if it is determined that the operation for stopping the engine is performed, the maximum lift amount of the intake valve is increased. Therefore, the amount of air taken into a combustion chamber of the engine is increased, and the compression ratio in the combustion chamber is substantially increased, as compared to the case where the aforementioned process is not executed. By increasing the compression ratio in this manner, the force required for a piston to compress the amount of intake air in the combustion chamber is increased. This stops the inertial rotation of the output shaft quickly. Also, at least one of the fuel injection and the ignition is stopped before the maximum lift amount is changed. Therefore, the output torque and the rotational speed of the engine are prevented from being increased due to the change in the maximum lift amount. Accordingly, with this configuration, the time required to completely stop the internal combustion engine can be appropriately reduced.

A second aspect of the invention relates to a control apparatus for an engine including a variable valve mechanism that can change the working angle of an intake valve. The control apparatus includes a determining device, a changing device, and a stop device. The determining device determines whether the operation for stopping the engine is performed. The changing device controls the variable valve mechanism so as to increase the working angle of the intake valve if the determining device determines that the operation for stopping the engine is performed. The stop device stops at least one of fuel injection and ignition before the changing device changes the working angle.

With this configuration, if it is determined that the operation for stopping the engine is performed, the working angle of the intake valve is increased (i.e., the period during which the intake valve is open is increased). Therefore, the amount of air taken into the combustion chamber of the engine is increased, and the compression ratio in the combustion chamber is substantially increased, as compared to the case where the aforementioned process is not executed. By increasing the compression ratio in this manner, the force required for the piston to compress the amount of intake air in the combustion chamber is increased. This stops the inertial rotation of the output shaft promptly. Also, at least one of the fuel injection and the ignition is stopped before the working angle is changed. Therefore, the output torque and the rotational speed of the engine are prevented from being increased due to the change in the working angle. Accordingly, with this configuration, the time required to completely stop the internal combustion engine can be appropriately reduced.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 3 illustrates a flowchart showing steps of control executed by an electronic control unit; and FIG. 4 illustrates a timing chart showing the modes of changes in the maximum lift amount, the working angle, and the like of an intake valve based on the aforementioned control.

DETAILED DESCRIPTION OF THE EXEMPLARY EMBODIMENTS

Figure 1:
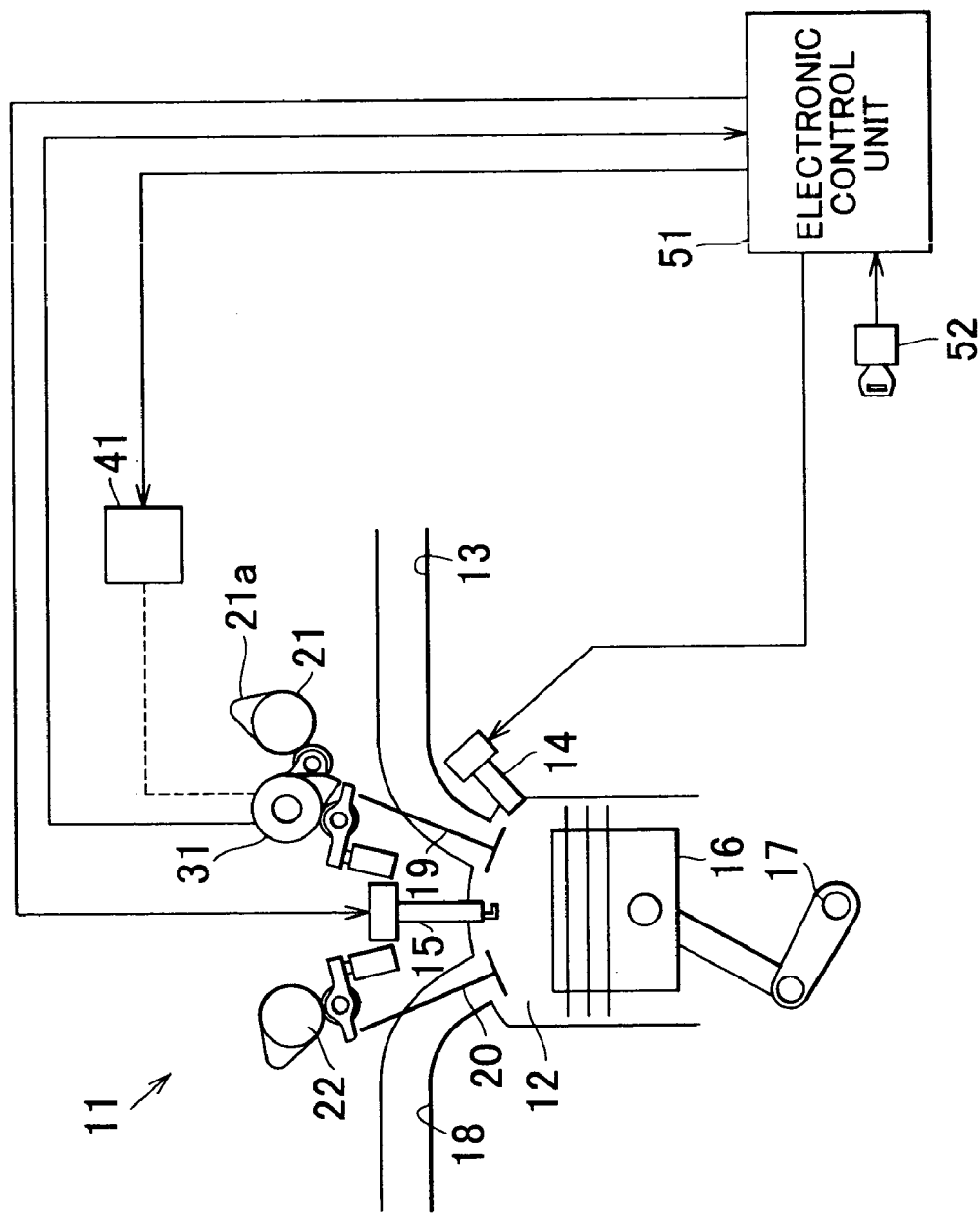
FIG. 1 illustrates a schematic diagram showing the configuration of an internal combustion engine according to an example embodiment.

As shown in FIG. 1, air is taken into each combustion chamber 12 of an internal combustion engine 11 through an intake passage 13, and fuel is directly injected into each combustion chamber 12 from a fuel injection valve 14 (in FIG. 1, only one combustion chamber is shown). Air is mixed with fuel to form air-fuel mixture. When an ignition plug 15 ignites the air-fuel mixture, the air-fuel mixture is burned and a piston 16 is reciprocated, which rotates a crankshaft 17 that is the output shaft of the engine. After the air-fuel mixture is burned, exhaust gas is discharged from each combustion chamber 12 to an exhaust passage 18.

In the internal combustion engine 11, communication between the combustion chamber 12 and the intake passage 13 is permitted/interrupted by opening/closing an intake valve 19. Also, communication between the combustion chamber 12 and the exhaust passage 18 is permitted/interrupted by opening/closing an exhaust valve 20. The intake valve 19 and the exhaust valve 20 are opened/closed in accordance with the rotation of an intake cam shaft 21 and an exhaust cam shaft 22 to which rotation of the crankshaft 17 is transmitted.

A variable valve mechanism 31 that changes the maximum lift amount and the working angle (i.e., the period during which the intake valve 19 is open) is provided between the intake cam shaft 21 and the intake valve 19. The maximum lift amount and the working angle are controlled by controlling the variable valve mechanism 31 using a motor 41.

Figure 2:
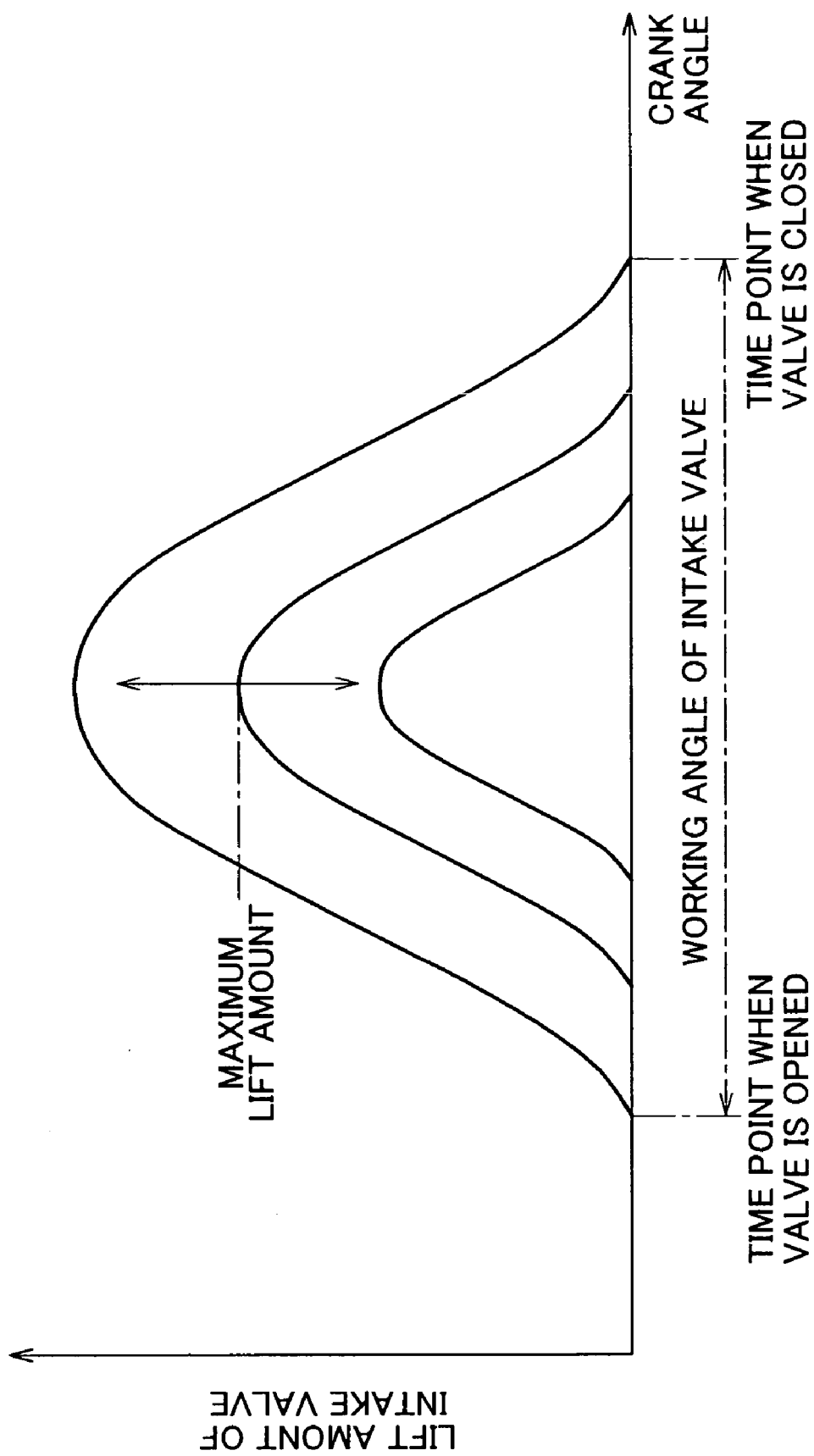
FIG. 2 illustrates a graph showing the modes of changes in the maximum lift amount and the working angle of an intake valve, caused by controlling a variable valve mechanism.

FIG. 2 shows the modes of changes in the maximum lift amount and the working angle, caused by the variable valve mechanism 31. As shown by a characteristic line in FIG. 2, the maximum lift amount and the working angle are changed in synchronization with each other. For example, as the working angle decreases, the maximum lift amount decreases. When the working angle decreases, the time point at which the intake valve 19 is opened and the time point at which the intake valve 19 is closed become close to each other. That is, when the working angle decreases, the period during which the intake valve 19 is open decreases. In this embodiment, the maximum lift amount and the working angle are continuously changed by controlling the variable valve mechanism 31 using the motor 41, in the manner shown by the characteristic line in FIG. 2.

Next, a control system in this embodiment will be described (refer to FIG. 1). In this control system, an electronic control unit 51 is provided. The electronic control unit 51 is part of an engine control system that controls operation of the internal combustion engine 11. The electronic control unit 51 executes fuel injection control of the fuel injection valve 14, ignition timing control of the ignition plug 15, and the aforementioned control of the maximum lift amount and the working angle. Also, the electronic control unit 51 executes control concerning supply of electric power to the entire engine control system.

Further, the electronic control unit 51, from an ignition switch 52, receives signals corresponding to the operation for stopping the internal combustion engine 11 (i.e., the operation of turning the ignition switch 52 off) and the operation for starting the internal combustion engine 11 (i.e., the operation of turning the ignition switch 52 on). Also, the electronic control unit 51 receives, from a sensor (not shown) provided in the variable valve mechanism 31, signals indicating the detected actual values of the maximum lift amount and the working angle (i.e., the actual maximum lift amount and the actual working angle).

The electronic control unit 51 controls the maximum lift amount and the working angle by controlling the variable valve mechanism 31 using the motor 41. For example, the amount of air taken into the combustion chamber 12 is adjusted according to the engine operating state such as the load of the internal combustion engine 11, by controlling the maximum lift amount and the working angle during the period from when the engine is started until when the ignition switch 52 is turned off. That is, for example, the amount of air taken into the combustion chamber 12 is reduced by reducing the maximum lift amount and the working angle through the aforementioned control. In this case, pumping loss can be reduced as compared to the case where the amount of air taken into the combustion chamber 12 is reduced by reducing the opening amount of the throttle valve. That is, loss of the output of the internal combustion engine 11 can be suppressed, which improves fuel efficiency.

However, in the case where the pumping loss remains small after fuel injection and ignition are stopped to stop the engine in response to the operation of turning the ignition switch 52 off, the rotational resistance against the idle rotation of the crankshaft 17 is reduced. As a result, the time required to completely stop the internal combustion engine 11 is increased.

In this embodiment, to suppress the increase in the time required to completely stop the engine, the maximum lift amount and the working angle are increased by controlling the variable valve mechanism 31 in response to the operation of turning the ignition switch 52 off. This control increases the amount of air taken into the combustion chamber 12 during the intake stroke by increasing the maximum lift amount and the working angle. By increasing the amount of air taken into the combustion chamber 12 in this manner, the force required to compress the air in the combustion chamber 12 is increased during the compression stroke. As a result, the rotational speed of the crankshaft 17 is decelerated more quickly, which suppresses the increase in the period during which the crankshaft 17 is rotated due to inertia.

Hereinafter, steps of the control concerning the variable valve mechanism 31 will be described with reference to a flowchart in FIG. 3. The electronic control unit 51 executes the control routine, for example, at predetermined time intervals as a time interrupt.

In this control routine, first, it is repeatedly determined whether the ignition switch 52 is turned off until the ignition switch 52 is turned off (step S100). That is, step S100 is repeatedly executed as long as a negative determination is made in step S100. If it is determined that the ignition switch 52 is turned off (YES in step S100), it is determined that a driver performs the operation for stopping the engine, and fuel injection by the fuel injection valve 14 and the ignition by the ignition plug 15 are stopped (step S110).

In step S110, the ignition is stopped after the fuel injection is stopped so that unburned gas introduced into the combustion chamber 12 by fuel injection is not discharged to the exhaust passage 18 without being burned. That is, the ignition is stopped after the fuel injection is stopped in order to burn the unburned gas in the combustion chamber 12.

After the fuel injection and the ignition are stopped, the maximum lift amount and the working angle are increased by controlling the variable valve mechanism 31 using the motor 41 (step S120).

This control of the variable valve mechanism 31 is repeatedly executed until the actual maximum lift amount reaches a target value. That is, an instruction signal for increasing the maximum lift amount and the working angle is repeatedly output from the electronic control unit 51 to the motor 41 until the actual maximum lift amount reaches the target value (step S130). As described above, in this embodiment, the maximum lift amount and the working angle are changed in synchronization with each other. Therefore, in step S130, the determination is made based on only the actual maximum lift amount. That is, in step S130, only the determination as to whether the actual maximum lift amount reaches the target value is made based on the signal indicating the detected value, which is sent from the variable valve mechanism 31. If a negative determination is made, that is, if it is determined that the actual maximum lift amount is less than the target value, step S120 is executed again.

The target value, that is, the target of the maximum lift amount is set such that the intake valve 19 is not closed at a time point during the compression stroke. In other words, the target value is set such that the intake valve 19 is closed at a time point during the intake stroke. Accordingly, when the compression stroke is started, the intake valve 19 has already been closed. Therefore, the air in the combustion chamber 12 is prevented from being returned to the intake passage 13 during the compression stroke. That is, the force required to compress the air in the combustion chamber 12 is prevented from being reduced due to return of the air during the compression stroke.

If an affirmative determination is made in step S130, that is, if it is determined that the actual maximum lift amount reaches the target value, supply of electric power to the aforementioned engine control system is stopped. Next, an example of the modes of changes in the maximum lift amount, the working angle, and the like caused by the control will be described with reference to FIG. 4.

As shown in FIG. 4, if the ignition switch 52 is turned off at time point t1, it is determined that the operation for stopping the engine is performed, and the fuel injection by the fuel injection valve 14 is stopped (time point t2). Further, the ignition by the ignition plug 15 is stopped (time point t3). Then, after the fuel injection and the ignition are stopped, the maximum lift amount and the working angle start to be increased by controlling the variable valve mechanism 31 using the motor 41 based on the instruction signal sent from the electronic control unit 51 (time point t4). At this time point, the maximum lift amount and the working angle start to be increased toward the target values from the values at the time point when the ignition switch 52 is turned off (i.e., starting values), for example, the values at the time point when idling operation is started.

When the maximum lift amount reaches the aforementioned target value, supply of electric power to the aforementioned engine control system is stopped (time point t5). Thus, in this embodiment, the electronic control unit 51 controls the variable valve mechanism 31 (motor 41) in order to increase the maximum lift amount and the working angle in response to the operation of turning the ignition switch 52 off (i.e., the operation for stopping the engine).

The electronic control unit 51 in this embodiment determines whether the operation for stopping the engine is performed. If it is determined that the operation for stopping the engine is performed, the electronic control unit 51 controls the variable valve mechanism 31 to increase the maximum lift amount and the working angle of the intake valve 19. The electronic control unit 51 can be regarded as the changing means for changing the maximum lift amount and the working angle. Also, the electronic control unit 51 can be regarded as the stop means for stopping fuel injection and ignition before the maximum lift amount and the working angle are changed by the changing means.

In this embodiment, the following effects can be obtained.

(1) In this embodiment, if it is determined that the operation for stopping the engine is performed, the maximum lift amount and the working angle of the intake valve 19 start to be increased. Therefore, the amount of air taken into the combustion chamber 12 is increased and the compression ratio in the combustion chamber 12 is substantially increased as compared to the case where the aforementioned process is not executed. By increasing the compression ratio in this manner, the force required for the piston 16 to compress the intake air in the combustion chamber 12 is increased. Therefore, the inertial rotation of the crankshaft 17 is stopped quickly. Because the fuel injection and the ignition are stopped before the maximum lift amount and the working angle are changed, the output torque and the rotational speed of the engine are prevented from being increased due to the change in the maximum lift amount and the working angle. Accordingly, in this embodiment, the time required to completely stop the internal combustion engine 11 can be appropriately reduced.

(2) In this embodiment, the maximum lift amount and the working angle of the intake valve 19 are increased such that the intake valve 19 is not closed at a time point during the compression stroke. Therefore, the compression ratio can be appropriately increased while preventing part of the air taken into the combustion chamber 12 during the intake stroke from being returned to the intake passage 13. This further reduces the time required to completely stop the engine.

The invention is not limited to the aforementioned embodiment. For example, the invention can be realized in embodiments described below.

In the aforementioned embodiment, if it is determined that the operation for stopping the engine is performed, the maximum lift amount and the working angle is increased such that the intake valve 19 is not closed at a time point during the compression stroke. However, the invention is not limited to this embodiment. For example, the intake valve 19 may be closed at a time point during the compression stroke such that the increase in the period during which the crankshaft 17 is rotated due to inertia is suppressed.

In the aforementioned embodiment, the ignition is stopped after the fuel injection is stopped in step S110. However, the invention is not limited to the embodiment. For example, the ignition may be stopped simultaneously with stop of the fuel injection. Alternatively, the fuel injection may be stopped after the ignition is stopped. Also, in the aforementioned embodiment, both the fuel injection and the ignition are stopped in step S110. However, only one of the fuel injection and the ignition may be stopped in step S110.

In the aforementioned embodiment, in step S130, only the determination as to whether the actual maximum lift amount reaches the target value is made. However, the invention is not limited to the embodiment. For example, the actual working angle may be detected, and it may be determined whether the actual working angle reaches the target value.

In the aforementioned embodiment, the variable valve mechanism 31 that continuously changes the maximum lift amount and the working angle is employed. Instead, for example, a variable valve mechanism that changes the maximum lift amount and the working angle in a stepwise manner.

The invention may be applied to an internal combustion engine that is automatically stopped when a predetermined condition is satisfied, irrespective of whether the driver turns the ignition switch 52 off. In this case, the maximum lift amount and the working angle are increased not only when the ignition switch 52 is turned off, but also, for example, when it is determined that the electronic control unit 51 performs the operation for automatically stopping the internal combustion engine. That is, the maximum lift amount and the working angle are increased, for example, when it is determined that the electronic control unit 51 generates an instruction signal for stopping the internal combustion engine 11 based on satisfaction of the aforementioned predetermined condition.

In the aforementioned embodiment, the variable valve mechanism 31 that can change both the maximum lift amount and the working angle is employed. However, the invention is not limited to the embodiment. For example, a variable valve mechanism that can change only the maximum lift amount or only the working angle may be employed. When employing the variable valve mechanism that can change only the maximum lift amount, the amount of air taken into the combustion chamber is changed by changing the maximum lift amount. When employing the variable valve mechanism that can change only the working angle, the amount of air taken into the combustion chamber is changed by changing the working angle.

What is claimed is:

1. A control apparatus for an internal combustion engine including a variable valve mechanism that can change a maximum lift amount of an intake valve, comprising:
    a determining device that determines whether an operation for stopping the engine is performed;
    a changing device that controls the variable valve mechanism so as to increase the maximum lift amount of the intake valve if the determining device determines that the operation for stopping the engine is performed; and
    a stop device that stops at least one of fuel injection and ignition before the changing device changes the maximum lift amount.

2. The control apparatus for an internal combustion engine according to claim 1, wherein the changing device increases the maximum lift amount of the intake valve such that the intake valve is not closed at a time point during a compression stroke.

3. The control apparatus for an internal combustion engine according to claim 1, wherein the stop device stops the ignition after stopping the fuel injection.

4. The control apparatus for an internal combustion engine according to claim 1, wherein the variable valve mechanism continuously changes the maximum lift amount of the intake valve.

5. The control apparatus for an internal combustion engine according to claim 1, wherein the variable valve mechanism can also change a working angle of the intake valve, and the changing device controls the variable valve mechanism so as to increase the working angle of the intake valve if the determining device determines that the operation for stopping the engine is performed.

6. A control apparatus for an internal combustion engine including a variable valve mechanism that can change a working angle of an intake valve, comprising:
    a determining device that determines whether an operation for stopping the engine is performed;
    a changing device that controls the variable valve mechanism so as to increase the working angle of the intake valve if the determining device determines that the operation for stopping the engine is performed; and
    a stop device that stops at least one of fuel injection and ignition before the changing device changes the working angle.

7. The control apparatus for an internal combustion engine according to claim 6, wherein the changing device increases the working angle of the intake valve such that the intake valve is not closed at a time point during a compression stroke.

8. The control apparatus for an internal combustion engine according to claim 6, wherein the stop device stops the ignition after stopping the fuel injection.

9. The control apparatus for an internal combustion engine according to claim 6, wherein the variable valve mechanism continuously changes the working angle of the intake valve.

10. A method for controlling an internal combustion engine, comprising:
    determining whether an operation for stopping an engine is performed;
    stopping at least one of fuel injection and ignition if it is determined that the operation for stopping the engine is performed; and
    increasing a maximum lift amount of an intake valve after stopping the at least one of fuel injection and ignition.

11. A method for controlling an internal combustion engine, comprising:
    determining whether an operation for stopping an engine is performed;
    stopping at least one of fuel injection and ignition if it is determined that the operation for stopping the engine is performed; and
    increasing a working angle of an intake valve after stopping the at least one of fuel injection and ignition.

* * * * *